United States Patent [19]

Nagasawa

[11] Patent Number: 5,937,094
[45] Date of Patent: *Aug. 10, 1999

[54] COMPRESSION AND DECOMPRESSION OF A MULTIDIMENSIONAL DATA ARRAY BY USE OF SIMULATED PARTICLES ARRANGED TO AN EQUATION OF MOTION INVOLVING REPULSION, VELOCITY RESISTANCE, AND A POTENTIAL GRADIENT

[75] Inventor: Mikio Nagasawa, Tokyo, Japan

[73] Assignee: Ultra-High Speed Network and Computer Technology Laboratories, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/543,877

[22] Filed: Oct. 19, 1995

[30] Foreign Application Priority Data

Mar. 24, 1995 [JP] Japan .................................. 7-065732

[51] Int. Cl.⁶ ................................ G06K 9/36; G06K 9/46
[52] U.S. Cl. ........................ 382/232; 382/203; 345/424
[58] Field of Search ..................................... 382/232, 107, 382/154, 203, 233, 285; 395/114, 119, 124, 127, 920; 364/496, 578; 345/420, 424, 427, 419

[56] References Cited

U.S. PATENT DOCUMENTS

| 4,821,164 | 4/1989 | Swanson ................................. 364/578 |
|---|---|---|
| 5,023,895 | 6/1991 | McCroskey et al. ....................... 378/4 |
| 5,081,532 | 1/1992 | Rabii ....................................... 348/452 |
| 5,200,910 | 4/1993 | Subbiah ................................... 364/578 |
| 5,331,552 | 7/1994 | Lloyd et al. ...................... 364/413.15 |
| 5,424,963 | 6/1995 | Turner et al. ........................... 364/578 |
| 5,438,526 | 8/1995 | Itoh et al. ................................ 364/578 |
| 5,526,281 | 6/1996 | Chapman et al. ...................... 364/496 |
| 5,553,004 | 9/1996 | Gronbech-Jensen et al. .......... 364/496 |

OTHER PUBLICATIONS

Spiegel, Theoretical Mechanics, 1967, pp. 64 and 116.

Primary Examiner—Amelia Au
Assistant Examiner—Timothy M. Johnson
Attorney, Agent, or Firm—Blakely Sokoloff Taylor & Zafman

[57] ABSTRACT

A method for compressing and decompressing multidimensional data based on approximating the data space by a smoothed particle cluster representation. The smoothed particle cluster representation is obtained by simulation for relaxation motion of a simulated particle corresponding to a sampling point to obtain a statistical average arrangement of the simulated particles on the basis of an equation of motion based on a potential theory given by an assumption that the simulated particles are moved upon receiving a repulsive force between the simulated particles, a velocity resistance, and a force proportional to a functional potential gradient having a large negative value in a region having a large original data value. The coordinates and an interval of the sampling points are obtained in accordance with an arrangement state of the simulated particles. The volume associated with each sampling point for obtaining the associated data value is the volume of the simulated particle. The sampling volumes may be caused to overlap by use of a compression parameter for the simulated particles.

10 Claims, 2 Drawing Sheets

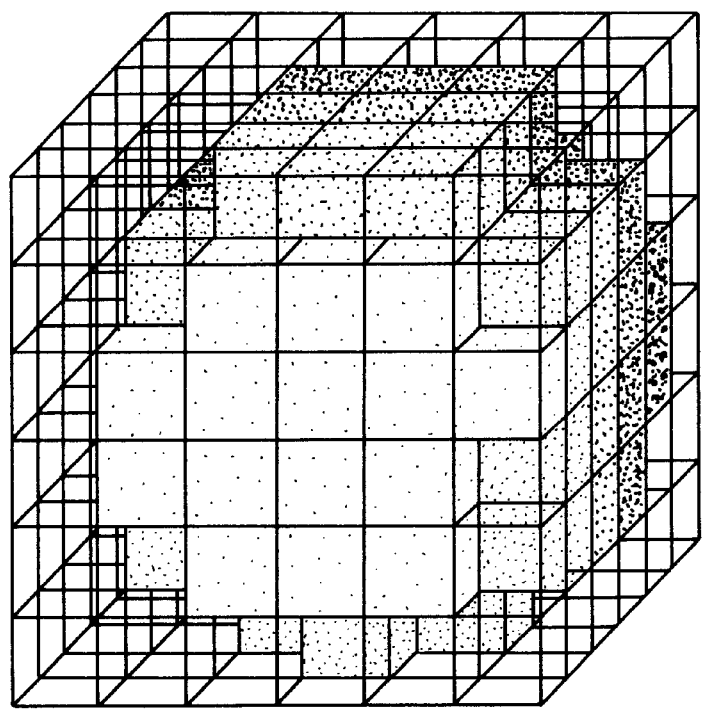
F I G. 1A
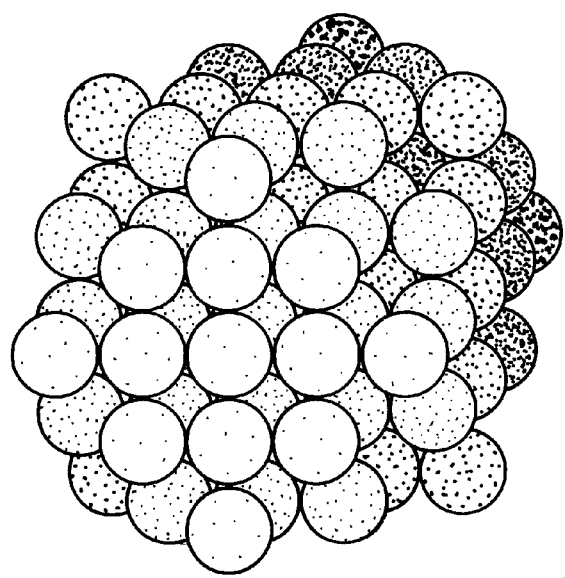
F I G. 1B

COMPRESSION AND DECOMPRESSION OF A MULTIDIMENSIONAL DATA ARRAY BY USE OF SIMULATED PARTICLES ARRANGED TO AN EQUATION OF MOTION INVOLVING REPULSION, VELOCITY RESISTANCE, AND A POTENTIAL GRADIENT

BACKGROUND OF THE INVENTION

The present invention relates to a data compression method of compressing multidimensional data such as 3-D volume data.

Extensive studies have been made on high-efficiency communications of speech and image data as a main theme in multimedia communications. Virtual reality and remote cooperative scientific simulations must be realized in communications of multidimensional (3-D or more), multivariate data In particular, if high-speed communication networks of Gbit/s class are available, large-scale data accesses will be frequently performed in such a manner that 3-D structure data of genes, molecules, and atoms are referred to for medical drug design, and voxels obtained from tomograms in "CT-scan" and nuclear magnetic resonance are referred to for remote medical diagnosis.

To generate and transfer multidimensional data of several hundreds of Mbytes at a maximum resolution, like data processed in the state-of-the-art scientific simulations, requires almost the communication band of a high-speed supercomputer bus.

Demand has arisen for developing a compression procedure which utilizes the characteristics of multidimensional scientific data.

In 3-D entertainment oriented games, most geometrical objects are represented by polygon sets.

The handling of polygons is highly optimized in the hardware of graphic workstations.

Although studies on high-speed processing by hardware at graphic workstations have been extensively made, 3-D scientific simulation outputs are not ordinarily represented as polygon sets, but are often represented as volume data in its original form, such as the 3-D scalar array $\rho(I,J,K)$.

The volume data include scalar data of density and temperature, vector data of velocity field and electromagnetic field, and nuclear magnetic resonance voxel data in the medical field. Most of the 3-D scientific data are represented not as polygons but as volume data.

These large data can be used as one of the important media in a multimedia network environment if the standard representation and efficient compression method of the volume data are available.

Techniques for compressing these data are a run-length method applied in facsimile transmission and discrete cosine transformation used in 2-D image compression.

In compressing image data represented in a 3-D array, a 2-D compression method may be expanded to a 3-D method.

A method of generating sampling points using particle coordinates (arranging particles) can also be proposed. According to this method, as for 3-D data, a process of motion of a sphere or particle having a predetermined radius is calculated on the basis of a force acting between two particles, and the coordinates of the center of the sphere in the force balanced equilibrium are defined as a sampling point position.

In the conventional arrangement as described above, when the technique used in 2-D image compression is directly used for 3-D compression, the complexity in algorithm greatly changes between the 2-D compression and the 3-D compression.

In the conventional compression, the correlation between adjacent data is used, but the order of these data poses a problem.

When the dimensionality increases, like 3-D, 4-D, . . . , the direction and the number of adjacent data also increase. It is difficult to apply this conventional compression technique unless the adjacent data are regularly arranged.

It is, for example, difficult to define adjacent volume data of non-structural grids, such as a polygon structure. In this case, it is difficult to apply the above technique.

In these conventional techniques, continuous control cannot be performed because the size of elements is fixed.

No consideration is made for an effective re-division method in the above conventional techniques.

In a conventional case, when a given parameter (determination condition) is designated, input data is compressed at a compression ratio of 50% to 70%. In the conventional case, the compression ratio cannot be specified to a specific value such as 50%.

The sampling point generation procedure using particle coordinates is effective to uniformly distribute sampling points within a given region. However, this procedure is not a procedure for adaptively arranging sampling points so as to regulate the resolution of a specific region.

SUMMARY OF THE INVENTION

The present invention has been made to solve the conventional problems described above, and has as its object to compress data while maintaining the resolution of a necessary portion in such a manner that the size of elements is continuously controlled without changing the complexity of an algorithm, regardless of the dimensionality of the data.

In order to achieve the above object of the present invention, there is provided a data compression method comprising the steps of performing simulation for relaxation motion of a particle corresponding to a sampling point to obtain a statistical average arrangement of the particles on the basis of an equation of motion based on a potential theory given by an assumption that the particles are moved upon receiving a repulsive force between the particles, a velocity resistance, and a force proportional to a functional potential gradient having a large negative value in a region having a large original data value, and determining coordinates and an interval of the sampling points in accordance with an arrangement state of the particles.

BRIEF DESCRIPTION OF THE DRAWINGS

FIGS. 1A and 1B are perspective views showing representation forms of multidimensional data, respectively;

DESCRIPTION OF THE PREFERRED EMBODIMENT

Prior to a description of an embodiment of the present invention, the present invention will be generally described below.

The present invention is associated with multidimensional data representations and their compression and uses a cluster representation using smoothed particles.

Volume data are obtained from an original array representation for a given variable at several compression resolution levels.

There are many macroscopic models for representing volume data.

These models generally use the Eulerian approach in which the volume is divided into voxels or particle representation in which the value of the data is assigned by particle distributions.

Recently, wavelet transformation has been used for 2-D image compression.

In such a spectral method, functional representation is also used.

The smoothed particle transformation algorithm is similar in that the kernel function is a solitary wave with the coordinates position and the spread parameter.

In contrast to the pure mathematical basis of the wavelet, the smoothed particle has the nature of physical and statistical mechanics.

They correspond to the probability distributions. The cluster representation using the smoothed particles has the flexibility to treat a complex 3-D data structure (3-D volume data) with "fragments", "voids", "free surfaces", and "multicomponents", as opposed to the voxel representation in which relatively uniform data is the main target object.

In the cluster representation, first, particles with a constant radius are distributed in a given volume data.

Second, the radius of the particles distributed in the region of higher resolution is reduced to cluster a larger number of particles.

Third, virtual equations of motion defining the motion of particles are numerically integrated to relax the particles to a stable state of the particle position and radius. The calculation of particle distribution relaxation is the key step. In this step, the particles are affected by the mutual repulsion force between two particles and the viscosity resistance.

Fourth, volume data values to be referred to are calculated as statistical expectation values from the resultant particle cluster representation.

In the cluster representation, as shown in FIGS. 1A and 1B, volume data (FIG. 1A) is first treated as a set of spatially extended N smoothed particles (FIG. 1B).

FIGS. 1A and 1B show representation forms of multidimensional data, in which FIG. 1A shows volume data representation using voxel data, and FIG. 1B shows representation using smoothed particle cluster.

The particles have the same generalized mass $m_0 = M/N$ and the internal distribution function $W(x,h)$ of existence probability.

Figure 2:
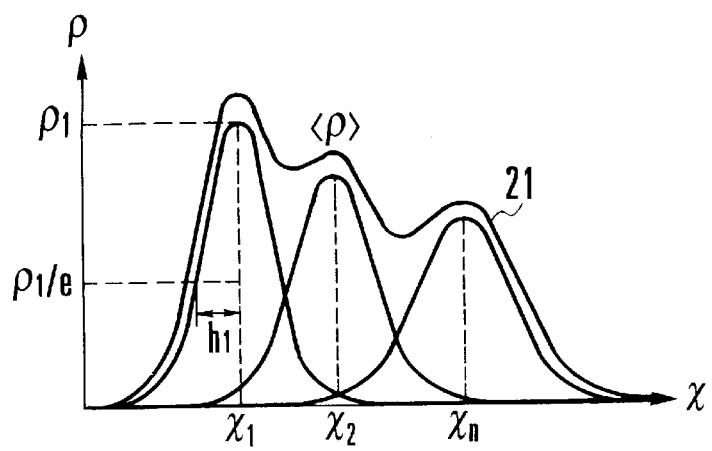
FIG. 2 is a graph showing the relationship between the particle distribution and the volume data.

The motion of each particle is described using the Lan-grange coordinate system, and an expectation value $<\rho>$ of a volume data value 21 on the Euler coordinate system is calculated from the distribution of particles $x_1, x_2, \ldots, x_n$, as shown in FIG. 2.

When the particle size is microscopic, the molecular dynamics can determine the thermodynamic volume data value of a gas with a number of particles up to $10^{23}$ in principle.

The smoothed particles are used in a macroscopic scale, and called sampling elements or constitute a statistical probability distribution.

From the superposition of smoothed particle kernel function $W(x,h)$, the volume data expectation value $<\rho>$ is mathematically calculated by equation (1) below:

$$<\rho(x)> = \int W(x-x',h)\rho(x')dx \quad (1)$$

with the normalization condition in 3-D case:

$$\int W(x,h)d^3x = 1 \quad (2)$$

The discrete integral is obtained as in the Monte Carlo method by equation (3) below:

$$\rho_i(x_i) = \frac{M}{N} \sum_{j=1}^{N} W(x_i - x_j, h_j) \quad (3)$$

where M is calculated by equation (4) below:

$$M = \int \rho(x)d^3x \quad (4)$$

where $\eta_i$ is the volume data expectation value at the center of the i-th particle, which is given by the superposition of neighboring particles, and $h_i$ is the smoothing radius or characteristic size of the i-th particle (FIG. 2).

In the cluster representation, the usual interpolation node points are not needed so the sampling point does not suffer from voxel tangling or inaccuracies associated with the severe distortion of the voxels.

The cluster representation is particularly suited for the representation of highly distorted multidimensional data.

Encoding will be described below.

To compress voxel data (volume data) as original data, an appropriate position must be determined for each smoothed particle in a given volume data region in the encoding process (setting sampling points) for obtaining a smoothed particle cluster.

For this purpose, the motion of smoothed particles corresponding to the sampling points is simulated under the influences of a potential force, a repulsive force, and a damping viscosity force.

To make a complete transformation (equations of motion) of volume data, the constitutive equation of particles and the potential serving as an external field are required.

The potential is uniquely determined by solving Poisson's equation (5) with given volume data $\eta(x)$ as a source term:

$$\Delta\psi(x) = 4\pi\eta(x) \quad (5)$$

Using this potential interaction, the surface condition can be treated in a general form without calculating the complex surface area.

The constitutive equation of the smoothed particle must be determined to reflect the properties of the distribution of volume data themselves as the properties of the particle distribution.

To allow extraction of the properties, a compression parameter which influences the compressibility of smoothed particles is introduced to cause the neighboring particles to always have overlapping portions.

This parameter is a parameter corresponding to a specific heat ratio in the physical simulation of a particle gas.

More specifically, the pressure term serving as the repulsive force between the particles is assumed to follow the equation of state of the polytropic gas, so that a polytropic index p is used in equation (6) below:

$$\frac{P}{P_0} = \left(1 + \frac{1}{p}\right)^{-1} \left(\frac{\rho}{\rho_0}\right)^{1+1/p} \quad (6)$$

Encoding in the smoothed particle cluster representation depends on parameters such as $\eta_0$, p, and $P_0$.

The polytropic index p is set to zero in a simple case wherein the volume data have almost the same value, thereby allowing the most appropriate encoding.

This is because the polytropic index p=0 represents the nature of an incompressible fluid, and the particle distribution is inevitably made uniform by the strong pressure gradient force.

In this case, the surface structure becomes the main feature of the volume data.

An increase in index p corresponds to the case wherein a highly compressive gas locally has a high-density region. The resolution of the volume data is increased in these regions by adopting the higher concentration of the smoothed particles.

The equation of motion for smoothed particles having the above nature is defined by equation (7) below:

$$m_0 \frac{d v_i}{d t} = -m_0 \sum_{j=1}^{N} \left(\frac{P_i}{\rho_i^2} + \frac{P_j}{\rho_j^2}\right) \nabla W(x_j, h_j) - m_0 \nabla \psi(x_i) - \varepsilon v_i \quad (7)$$

where $x_j$ and $v_j$ are the position and velocity of the j-th particle, respectively. The first term in the right hand side of equation (7) is the pressure gradient force causing particles to repel each other. The second term is the potential force, which is reduced by equation (5). In the second term, $\nabla \psi(x_i)$ is the adjacent average field gradient at $x_i$.

The particle is settled down to an optimal position through the relaxation process, and the viscosity damping force for this purpose is represented by the third term on the right hand side of equation (7). The convergence speed is controlled by the coefficient $\varepsilon$.

Decoding will now be described below.

To decode volume data from the smoothed particle cluster representation is to calculate the weights on the voxels obtained from the particle distribution.

There are several methods to calculate the voxel weights.

In the simplest, the data values of particles located within the voxels are accumulated. The first order method weights the voxels in consideration of the distance between the particle coordinates and the voxel node point to distribute the particle data values to the respective voxels.

In the second order method, data values in accordance with a sub-voxel volume ratio defined by the particle position and the voxel boundary are distributed.

The method of calculating the expectation value from the smoothed particle cluster depends not on the positions of the particle and the voxel but on the statistical average obtained from the expectation value at arbitrary spatial coordinates.

The data value at an arbitrary spatial position x can be decoded by the integral operation of equation (8) using a data set $\{(m_0, x_i, h_i) | i=1, N\}$ of the smoothed particle representation:

$$\rho(x) = \frac{m_0}{\pi \sqrt{\pi}} \sum_{j=1}^{N} \frac{1}{h_j^3} \exp(-|x_i - x_j|^2 / h_j^2) \quad (8)$$

Equation (8) is the Gaussian embodiment of equation (3). The feature of this transformation lies in that the smoothed particle cluster enables the exact conservation of the integrated value.

In general, numerical errors are caused in the interpolation calculation performed together with encoding and decoding. The smoothed particle cluster representation allows volume data decoding independently of local interpolation errors.

For example, if the volume data represent the mass density, the total mass will be conserved through the transformation.

It is desirable to transmit data in a predetermined communication band in consideration of data access in the network environment, as described above.

The smoothed particles are scattered or gathered to change the total particle number to allow resolution adjustment.

However, judging from the above description, the resolution must be refined without changing the total particle number.

Optimization of spatial resolution with a constant smoothed particle number will be described below.

One of the important parameters capable of optimizing the sampling point positions and controlling the dynamic range of the smoothed particle cluster is the smoothing radius h. The smoothing radius h corresponds to the spatial resolution of each individual particle.

When the statistical expectation value is calculated using particles having a constant radius, as in the Monte Carlo method, gathering and scattering limit the ratio of the maximum value to the minimum value of the data to be represented, that is, they limit the dynamic range.

In the condensed situation of particles, the particles may touch each other in the cubic center configuration. Alternatively, if the compression index p is large, the particles may be perfectly overlapped. However, in the sparse case, the distance between the particles increases, and the expectation value in the range exceeding a given cut-off radius (e.g., R to 2 h) becomes indefinite.

$$(\text{cutoff} \sim 2h) \frac{1}{8} \leq \frac{\rho}{\rho_0} \leq \begin{cases} 9 & (\text{cubic center}) \\ N & (\text{overlap}) \end{cases} \quad (9)$$

When the particles are set in the cubic center configuration, the dynamic range does not depend on the total particle number N.

Even if the total particle number N increases without any limitation, the value range to be represented cannot increase although the spatial resolution becomes higher.

On the other hand, when the particle radius can be changed according to equation (10), the volume data can be represented by tightly packed smoothed particle clusters.

$$h_i = \left(\frac{m_0}{\rho(x_i)}\right)^{1/3} \quad (10)$$

In this adaptive control, the smoothed particle representation has an advantage in that non-uniform volume data can be compressed with a high efficiency.

Care must be taken for treating a region where volume data values are absent.

The structure of the sparse region where sampling points are small can be calculated by the average extrapolation calculation.

Since the expectation value is calculated by a particle having a large smoothing radius h in this region, information in a broader range is included to degrade local reproduction.

The following countermeasure is taken for this drawback.

The smaller the value a region has, the less important it becomes. Otherwise, a reciprocal or inverse value of the original data can be used to represent a smoothed particle cluster, thereby maintaining the precision of a highly important region.

An embodiment of the present invention will be described with reference to the accompanying drawings.

Figures 3A, 3B:
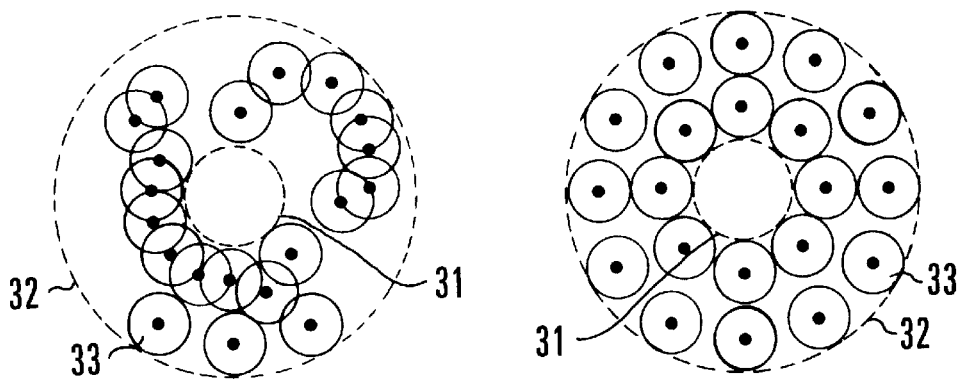
FIGS. 3A to 3C are plan views showing states in which smoothed particles are arranged, respectively.
Figure 3C:
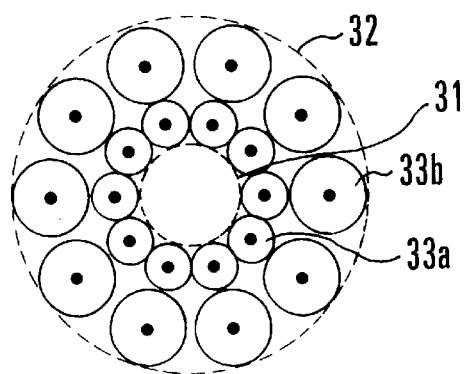

Each of FIGS. 3A to 3C shows a state in which smoothed particles 33 are arranged between an internal boundary 31 and an external boundary 32.

To perform encoding to obtain cluster representation, 3-D smoothed particles which move in an external potential are simulated.

To set standard initial conditions, the smoothed particles 33 are distributed in accordance with a random number (FIG. 3A). At this time, the sampling point system is non-uniform and cannot be returned to the original data (voxel data). It is not suitable to use non-uniform sampling point system in 3-D volume data.

While the radius is kept constant, the smoothed particles 33 are moved on the basis of equations (11) and (12) of motion:

$$v_i = \frac{dx_i}{dt} \tag{11}$$

$$\frac{dv_i}{dt} = -\frac{1}{N}\sum_{j=1}^{N}\left(\frac{P_i}{\rho_i^2} + \frac{P_j}{\rho_j^2}\right)\nabla W(x_j, h_j) - \nabla \psi(x_i) - \varepsilon v_i \tag{12}$$

As a result, the particles are arranged to have a given average interval by the repulsive force between the smoothed particles 33, as shown in FIG. 3B.

When an increase in resolution near the internal boundary 31 in the region between the internal boundary 31 and the external boundary 32 is required, a potential $\psi$ having the minimum value at the internal boundary 31 is introduced to calculate the integral value using equation (12).

At this time, a radius $h_i$ of the smoothed particles 33 is changed in correspondence with equation (10).

The present invention, however, is not limited to this. The radius $h_i$ of the smoothed particles may be changed in correspondence with the local gradient of the potential $\psi$ in accordance with equation (13) below:

$$h_i = \left|\frac{\psi}{|\nabla \psi|}\right| \tag{13}$$

As a result, as shown in FIG. 3C, in the resultant sampling point system, a region close to the internal boundary 31 has a small sampling interval obtained by smoothed particles 33a, thereby increasing the resolution. On the other hand, a region close to the external boundary 32 has a large sampling interval obtained by smoothed particles 33b.

The degree of concentration of this adaptive sampling point (smoothed particles 33a and 33b) arrangement can be controlled by adjusting the pressure (equation (14)) corresponding to the repulsive force term of equation (12):

$$P_i \rho_i^{1+1/P} \tag{14}$$

In equation (14), a decrease in polytropic index p corresponds to an incompressible approximation, thereby obtaining a particle arrangement having a constant density.

To the contrary, an increase in polytropic index p leads to a highly concentrated arrangement.

In this embodiment, using equation (15) as a Gaussian distribution function in the calculation of the particle arrangement, the node point probability which represents the density distribution required for calculating the pressure term in equation (12) of motion is calculated using equation (16):

$$W(x, h) = \frac{1}{\pi\sqrt{\pi} h^3}\exp(-|x|^2/h^2) \tag{15}$$

$$\rho_i \equiv \rho(x_i) = \frac{1}{N}\sum_{j=1}^{N}\frac{m_0}{\pi\sqrt{\pi} h_j^3}\exp(-|x_i - x_j|^2/h_j^2) \tag{16}$$

The average potential $\langle\psi\rangle$ expected from the discrete particle arrangement can be calculated by equation (17) using the same distribution function:

$$\langle\psi(x_i)\rangle = \frac{1}{N}\sum_{j=1}^{N}\frac{1}{|x_i - x_j|}[\text{erf}(|x_i - x_j|/h_j] \tag{17}$$

A deviation between the given potential $\psi$ and the average potential $\langle\psi\rangle$ is utilized as the convergence determination condition in the calculation of the particle relaxation motion.

The average potential $\langle\psi\rangle$ of an arbitrarily given sampling point system is calculated by equation (17) to determine the suitability of the sampling point system.

When using an adaptive sampling point arrangement as the initial state of particle relaxation, the arrangement using random numbers shown in FIG. 3A is not used. The uniform arrangement shown in FIG. 3B is used instead to obtain an adaptive sampling arrangement as shown in FIG. 3C with fewer relaxations.

One example shows the local radius of curvature has a spatial structure of about 0.1 R with respect to a scale R of spread of the volume data. The maximum value of the data is $\rho_{max}$ which is equal to 53 $\rho_)$ where $\rho_0$ is the average data value. For this example, the cluster representation can be obtained using N (=400) smoothed particles as the sampling points.

Following the same procedures as in the above embodiment, a smoothed particle configuration whose central portion has the smoothing radius h corresponding to a high resolution of about 0.03 R was obtained.

To obtain the same resolution using a set of voxels having a constant size, the number of voxels is required as $N_v=30^3=27,000$.

As has been described above, according to the present invention, particles corresponding to sampling points are simulated to be relaxation-moved on the basis of the equation of motion based on the potential theory, so that the statistically averaged arrangement of the particles can be obtained. Therefore, the particle arrangement without any distortion can be obtained.

The particle radius is determined by the local gradient ratio of the particle potential using the feature scale of the adjacent average field gradient, thereby obtaining a high resolution.

For this reason, even if data have different dimensionalities, the data can be compressed with a reduced numerical error without changing the complexity of the algorithm, while the resolution of the necessary part is maintained.

Since the adaptive sampling points are generated without changing the number of sampling points, the data array size need not be dynamically changed, and adaptive sampling point calculation can be performed in a computer whose storage capacity is limited.

Even an adaptive sampling point used to represent a given region can be used as a prototype for generating a sampling point for representing another arbitrary region.

What is claimed is:

1. A data compression method comprising the steps of:

receiving a multidimensional data array representing volume data for a volume;

creating a smoothed particle cluster representation of the volume by distributing simulated particles with a constant radius in the volume described by the volume data, and performing simulation for relaxation motion of a simulated particle corresponding to a sampling point to obtain a statistical average arrangement of the particles on the basis of an equation of motion based on the potential theory given by an assumption that the particles are moved upon receiving a repulsive force between the particles, a velocity resistance, and a force proportional to a functional potential gradient having a large negative value in a region having a large original data value;

determining coordinates of the sampling points and a sampling volume associated with the sampling point based on the statistical average arrangement of the simulated particles in the smoothed particle cluster representation; and calculating a smoothed particle data value for each sampling point by determining the statistical expectation value of the values contained within the sampling volume associated with the sampling point whereby the collection of smoothed particle data values in the smoothed particle cluster representation are a compressed representation of the volume data as compared to the multidimensional data array.

2. A method according to claim 1, further comprising the step of deciding a radius of the simulated particle which corresponds to the interval of the sampling points in accordance with a local gradient ratio of the particle potential utilizing a feature scale of an adjacent average field gradient.

3. A method according to claim 1, further comprising the step of obtaining an average potential of a given particle arrangement and comparing the average potential with the functional potential gradient, thereby determining the suitability of an arrangement state of the sampling points.

4. A method according to claim 1, wherein the multidimensional data array is voxel data.

5. A method according to claim 1, wherein the step of distributing simulated particles comprises distributing the simulated particles with a random distribution.

6. A method according to claim 1, wherein the step of distributing simulated particles comprises distributing the simulated particles with a uniform distribution.

7. A method according to claim 1, further comprising the step of reducing the radius of particles distributed in regions of higher resolution.

8. A data decompression method comprising the steps of:

receiving a collection of smoothed particle data values in a smoothed particle cluster representation of volume data, where the smoothed particle cluster represents a statistical average arrangement of the smoothed particles on the basis of an equation of motion based on the potential theory given by an assumption that the smoothed particles are moved upon receiving a repulsive force between the smoothed particles a velocity resistance, and a force proportional to a functional potential gradient having a large negative value in a region having a large original data value; and creating a voxel representation of the volume data by calculating a voxel weight for each voxel in the voxel representation by accumulating the smoothed particle data values for all smoothed particles that intersect the voxel whereby the voxel representation is an uncompressed representation of the volume data as compared to the collection of smoothed particle data values.

9. A method according to claim 8, wherein calculating the voxel weights further comprises weighting the voxel in consideration of the distance between a smoothed particle coordinate and a voxel node point.

10. A method according to claim 8, wherein calculating the voxel weights further comprises weighting the voxel in accordance with a sub-voxel volume ratio defined by the particle position and the voxel boundary.

\* \* \* \* \*

UNITED STATES PATENT AND TRADEMARK OFFICE
CERTIFICATE OF CORRECTION

PATENT NO. : 5,937,094
DATED : August 10, 1999
INVENTOR(S) : Nagasawa

It is certified that error appears in the above-identified patent and that said Letters Patent is hereby corrected as shown below:

Item [54], line 3, and also Column 1, line 3,
Delete "PARTICLES ARRANGED TO AN EQUATION" and insert -- PARTICLES ARRANGED ACCORDING TO AN EQUATION --.

Column 4,
Line 13, delete "where $\eta_i$ is the volume" and insert -- where $\rho_i$ is the volume --.
Line 47, delete "volume data $\eta(x)$" and insert -- volume data $\rho(x)$ --.

Column 5,
Line 7, delete "such as $\eta_o$" and insert -- such as $\rho_o$ --.

Column 8,
Line 1, delete $Pi\rho_i^{1+1/P}$" and insert -- $Pi\alpha\rho_i^{1+1/P}$ --.
Line 46, delete "equal to 53 $_\rho$)" and insert -- equal to 53 $_{\rho o}$ --.

Signed and Sealed this

Eleventh Day of September, 2001

*Attest:*

NICHOLAS P. GODICI
*Attesting Officer*     Acting Director of the United States Patent and Trademark Office